Oct. 3, 1967 J. J. EDDY 3,344,600
POWER PLANT

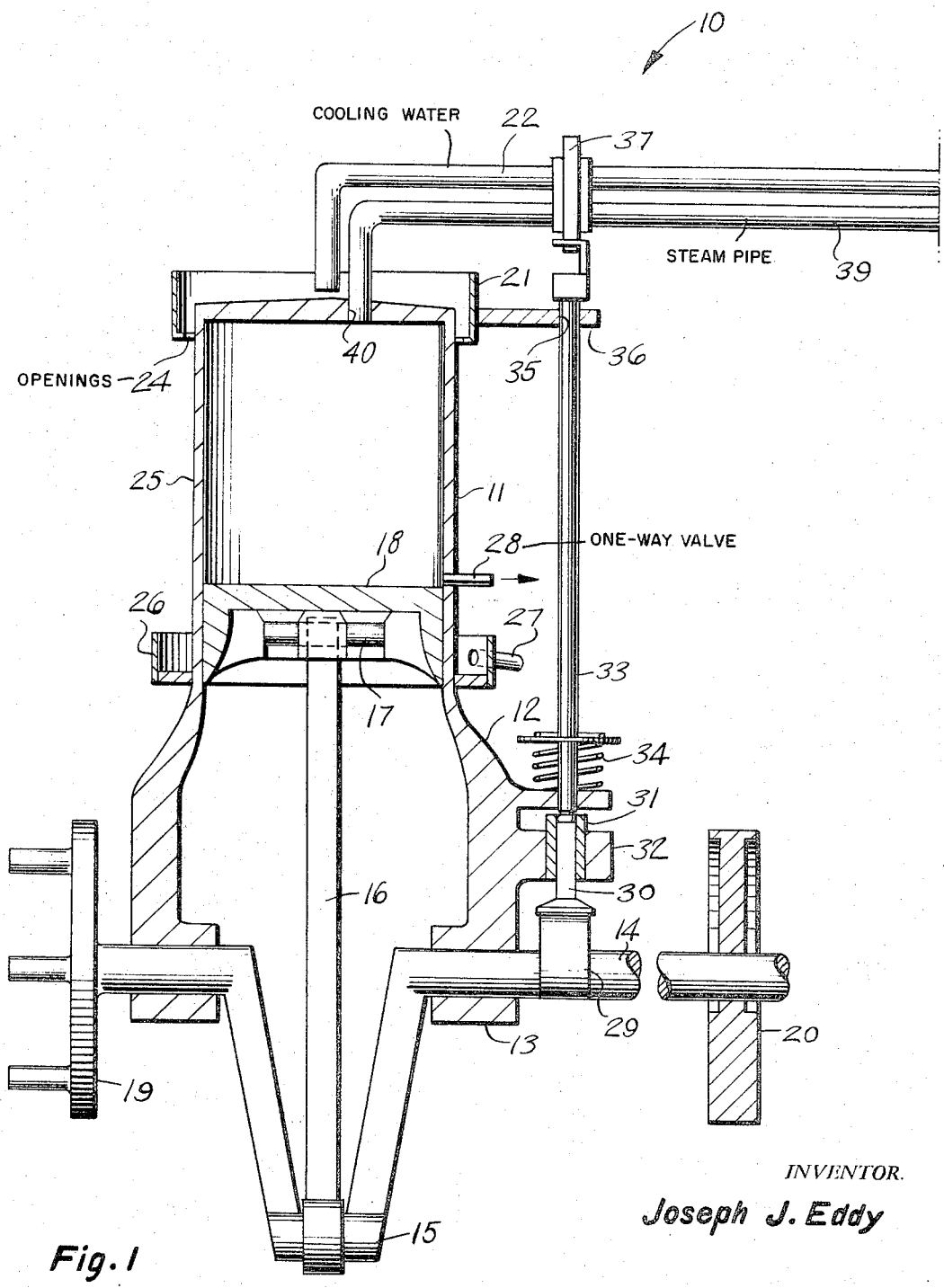

Filed Sept. 3, 1965 2 Sheets-Sheet 2

INVENTOR.
Joseph J. Eddy

3,344,600
POWER PLANT
Joseph J. Eddy, 8511 Sharp Ave.,
Sun Valley, Calif. 91352
Filed Sept. 3, 1965, Ser. No. 484,980
1 Claim. (Cl. 60—1)

This invention relates to devices for generating electric power.

It is therefore the main object of this invention to provide a power plant which will be stationary or portabe and may be set up where the power is to be used and will generate electric power to pump water from deep wells.

Another object of this invention is to provide a power plant which will be noiseless, will not consume any air, and will operate on the air pressure of the atmosphere.

Another object of this invention is to provide a power plant which will operate on the sea, on the desert, on farms, and anywhere that atmospheric pressure is present, thus eliminating the necessity for running power lines and will require five to ten pounds steam pressure, the same low pressure being used by larger or smaller power plants.

Still another object of this invention is to provide a power plant which will use ten to fourteen p.s.i. of atmospheric pressure for the upward stroke and approximately the same amount of steam pressure for the downward stroke and if desired the electricity produced may be stored in batteries.

Other objects and advantages of the invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claim.

In the drawings:

FIGURES 1 and 1a are composite views of this invention.

Figure 1A:
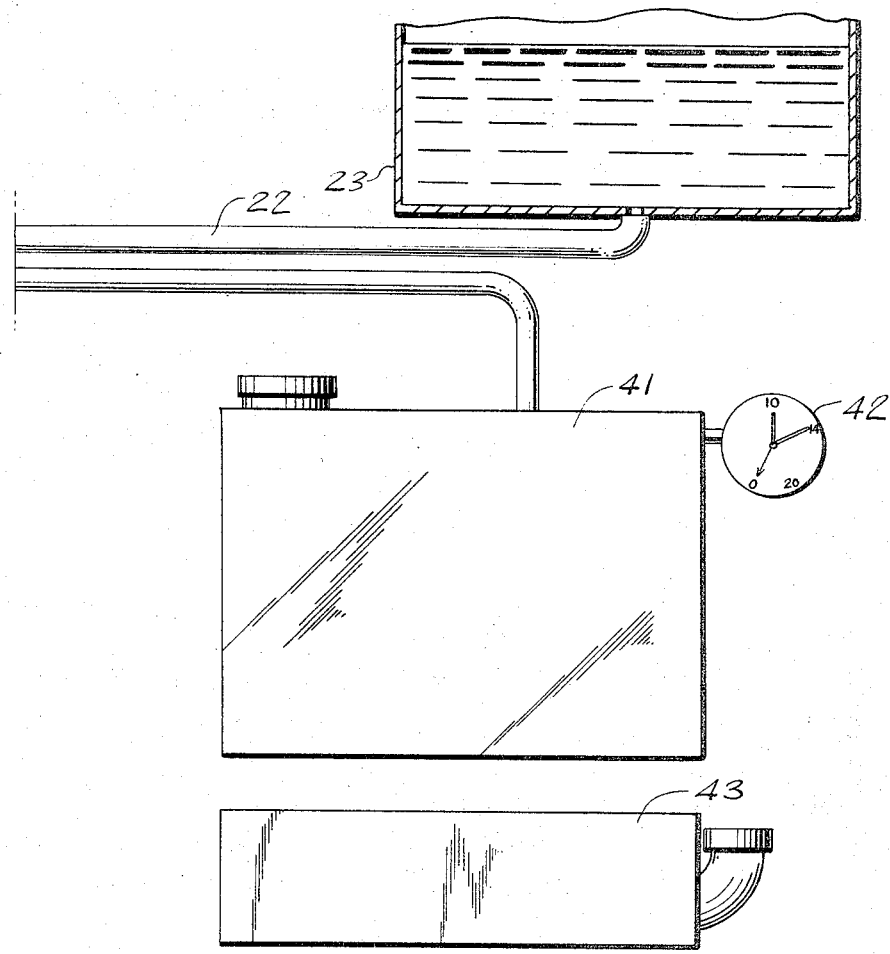
Figure 2:
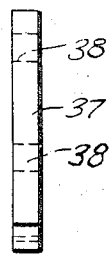
FIGURE 2 is an end view of the valve shown in FIGURE 1.
Figure 3:
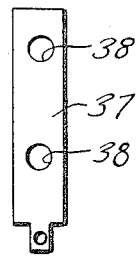
FIGURE 3 is a plan view of FIGURE 2.

According to this invention, a power plant 10 is provided with a hollow cylinder 11 made of aluminum alloy or other suitabe material. Cylinder 11 extends upwards from crankcase 12 which is provided with a pair of bearings 13 having grease fittings (not shown). Bearings 13 receive crank shaft 14 which is provided with a journal 15 receiving a connecting rod 16. The other end of connecting rod 16 receives a wrist pin 17 of piston 18 which oscillates within the fore of cylinder 11. One end of crank shaft 14 is provided with a flange 19 for power take-off and the other end of crank shaft 14 is provided with a fly wheel 20. It will be noted that any number of cylinders 11 and the respective components may be attached to shaft 14. A collar 21 is secured to the upper extremity and exterior of cylinder 11 and receives water from water pipe 22, the water being gravity fed from water tank 23 for the cooling of cylinder 11. The water received within collar 21 enters a plurality of openings 24 through collar 21 and travels down the outer periphery 25 of cylinder 11 until it reaches a collar 26 around the lower extremity of cylinder 11 thus cooling cylinder 11 when power plant 10 is in operation. The water is drained from collar 26 by means of pipe 27 secured to collar 26 and may be gravity fed into any suitable container. A one way valve 28 extends from cylinder 11 and allows for the escape of steam exhaust from power plant 10. A cam 29 secured to crank shaft 14 provides a means of lifting a cam follower 30 which is slidably received within a bushing 31 secured within a projection 32 of crank case 12 and cam follower 30 when actuated by cam 29 urges folower rod 33 upwards and a return spring 34 is received on the lower extremity of follower rod 33. The upper extremity of cam follower rod 33 is slidably received within an opening 35 of a projection 36 of collar 21. A flat valve 37 operated by follower rod 33 is secured to the upper extremity of follower rod 33 and is provided with a pair of spaced apart openings 38 which controls the cycling of the steam under pressure in steam pipe 39. Steam pipe 39 is secured within opening 40 of cylinder 11 and the steam under pressure is directed against piston 18 within cylinder 11. The other end of steam pipe 39 is secured to a steam tank 41 having a low pressure steam gage 42. Steam is produced in tank 41 by means of a burner and tank 43 beneath steam tank 41.

What I now claim is:

In a power plant, the combination of a cylinder, a piston slideable within said cylinder, said piston being connected by a wrist-pin to one end of a connecting rod, the opposite end of said connecting rod being connected to a crank journal formed on a crank shaft, said crank shaft being rotatably supported between a pair of spaced apart bearings in axial alignment, said bearings being formed in a lower part of a crank case having said cylinder formed at the upper portion thereof, one end of said crank shaft being flanged for connection to any of various driven mechanisms, the opposite end of said crank shaft having a flywheel secured thereto, a cam carried by said crank shaft, a cam follower at the lower end of a vertical rod, said cam follower being in engagement with said cam of said crank shaft, valve means at the upper end of said vertical rod, said valve means comprising a flat valve having a vertically sideable plate, a pair of openings extending through said plate, each said opening in said plate being moveable into alignment with a water pipe and steam pipe passing through said flat valve, one end of said water pipe being connected to a water tank, one end of said steam pipe being connected to a steam tank having a burner located there beneath, the opposite end of said steam pipe being connected to the upper end of said cylinder for the purpose of directing steam against the upper side of said piston, a collar comprising an outwardly extending flange around the upper portion of said cylinder, said flange having an integral upwardly extending side wall to form a container above said cylinder, said container having a plurality of openings within said flange, the opposite end of said water pipe being directed into said container for delivering water from said water tank into said container and outwardly through said openings around the sides of said cylinder, a lower collar around a lower portion of said cylinder, said lower collar comprising a peripheral container for catching said water moving downwardly around the outer side of said cylinder, said lower collar having a drain pipe secured thereto for draining outwardy said water therefrom, and said cylinder having a port at its lower end and a one-way valve connected to said port and permitting flow from the interior of said cylinder when said piston is at a lower end of a stroke within said cylinder, said valve providing a means for escape of exhaust steam from within said cylinder.

References Cited

UNITED STATES PATENTS

| 448,597 | 3/1891 | Vanduzen | 123—41.72 X |
| 632,814 | 9/1899 | Hay et al. | 123—41.72 X |
| 879,954 | 2/1908 | Fox | 123—41.53 |
| 2,429,035 | 10/1947 | Steving | 60—1 |
| 3,192,705 | 7/1965 | Miller | 60—59 X |

FOREIGN PATENTS 428,242  4/1926  Germany.

EDGAR W. GEOGHEGAN, *Primary Examiner.*